United States Patent [19]

van der Lely

[11] 4,033,418

[45] July 5, 1977

[54] TINE MOUNTING FOR ROTARY HARROW INCLUDING U-SHAPED RECESS

[76] Inventor: Cornelis van der Lely, 7, Bruschenrain, Zug, Switzerland

[22] Filed: Jan. 29, 1975

[21] Appl. No.: 545,037

[30] Foreign Application Priority Data

Jan. 31, 1974 Netherlands ............... 7401323

[52] U.S. Cl. ........................... 172/763; 172/59; 172/770; 172/771; 403/259; 403/261; D15/29

[51] Int. Cl.² ......................................... A01B 15/00

[58] Field of Search ............ 172/59, 520, 522, 523, 172/524, 525, 526, 647, 713, 721, 762, 763, 765, 770, 771, 753; 403/253, 259, 261, 334, 350, 352, 370, 375, 383; D34/1 R, 1 A, 1 B; D40/1 E; D15/11, 12, 29

[56] References Cited

UNITED STATES PATENTS

| 203,417 | 5/1878 | Carson ........................... 403/259 |
| 706,265 | 8/1902 | Smalley ......................... 403/259 |
| 2,318,051 | 5/1943 | Brace ........................ 403/253 X |
| 3,809,166 | 5/1974 | van der Lely et al. ........... 172/763 |
| 3,902,560 | 9/1975 | van der Lely .................... 172/59 |
| D237,527 | 11/1975 | van der Lely .............. 172/713 X |

Primary Examiner—Richard T. Stouffer
Attorney, Agent, or Firm—Mason, Mason & Albright

[57] ABSTRACT

A rotary harrow has soil working members, each of which includes a tine mounting wherein a horizontal support has a holder with a tine at one end, or both ends. Near the top of the fastening portion are one or two recess stops that are engaged by tightening elements to urge the fastening portion in tight engagement within an internal bore of the holder so that tension or compression is exerted on the interfit between bore and fastening portion. The fastening portion can taper upwardly and the bore is shaped with surfaces that conform to the taper of that portion. The tightening elements can be a nut and bolt combination, an externally threaded member or a pivoted cam that is turned with a tool. The fastening portion can have a region of reduced diameter so that it bears on two spaced apart areas of the bore.

Additionally, the fastening portion can include a substantially U-shaped recess, which can be engaged by one of the nut and bolt combination or the externally threaded member.

7 Claims, 12 Drawing Figures

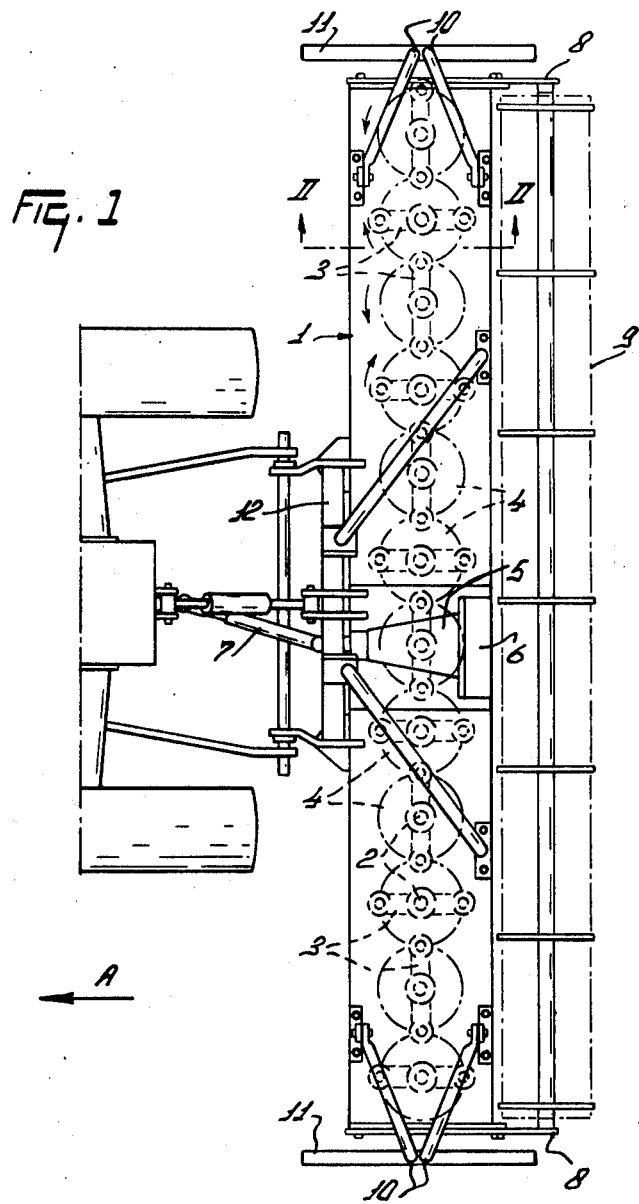

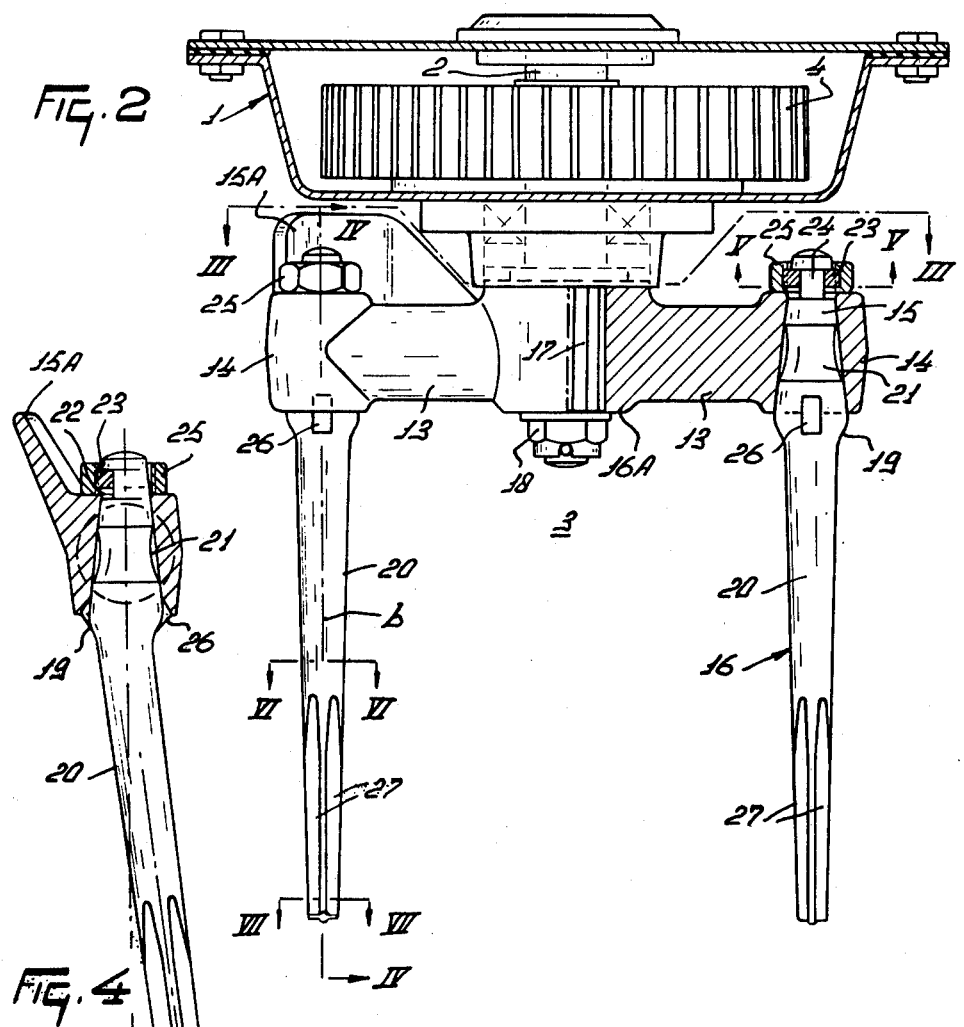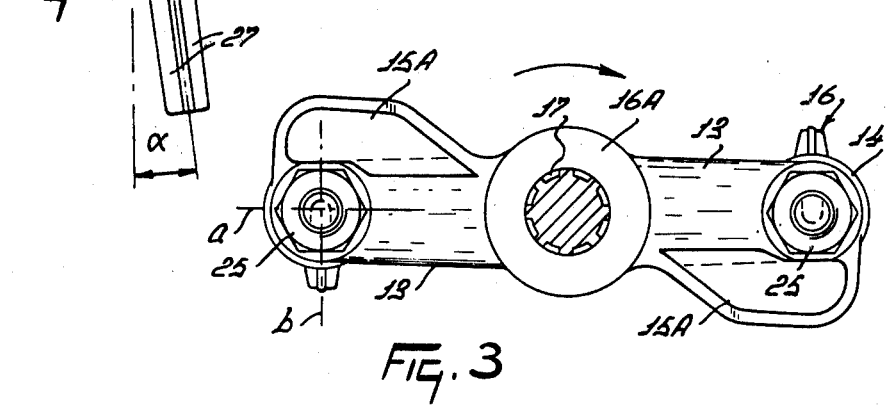

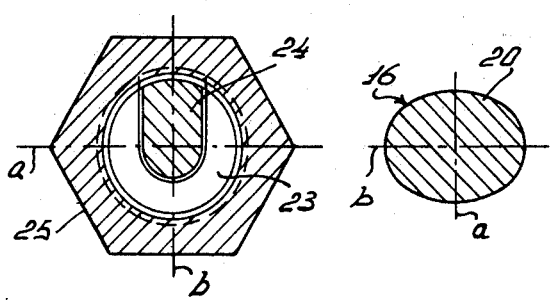
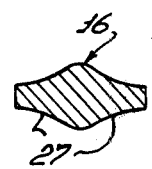
Fig. 5    Fig. 6    Fig. 7
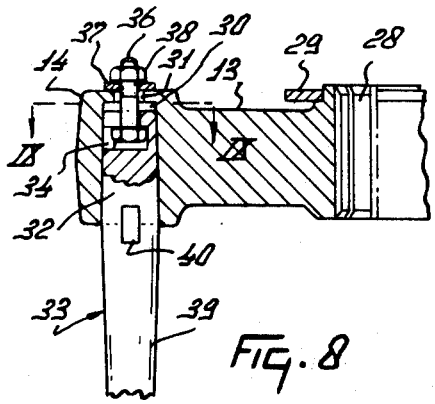
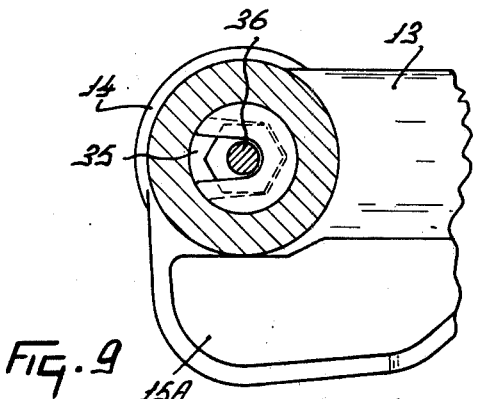
Fig. 8    Fig. 9
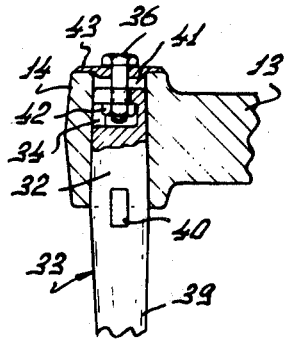
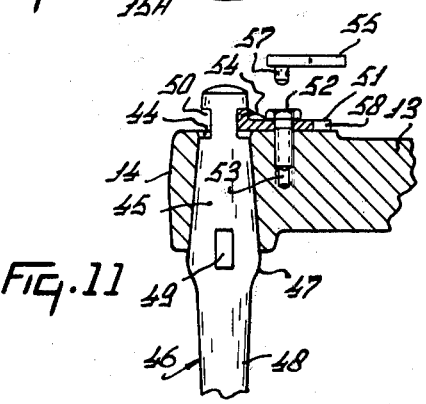
Fig. 10    Fig. 11
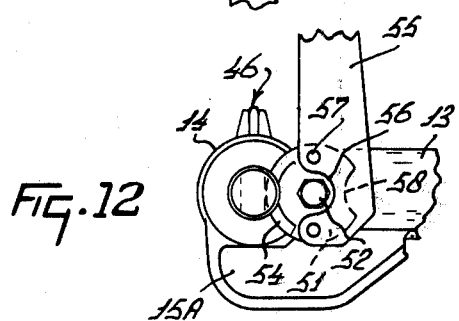
Fig. 12

TINE MOUNTING FOR ROTARY HARROW INCLUDING U-SHAPED RECESS

For a better understanding of the invention, and to show how the same may be carried into effect, reference will now be made, by way of example, to the accompanying drawings, in which:

FIG. 1 is a plan view of a rotary harrow having tines that are mounted in accordance with the invention, the harrow being connected to the rear of an agricultural tractor, FIG. 2 is a section, to an enlarged scale, taken on the line II—II in FIG. 1, FIG. 3 is a section taken on the line III—III in FIG. 2, FIG. 4 is a section taken on the line IV—IV in FIG. 2, FIG. 5 is a section, to an enlarged scale, taken on the line V—V in FIG. 2, FIG. 6 is a section, to an enlarged scale, taken on the line VI—VI in FIG. 2, FIG. 7 is a section, to an enlarged scale, taken on the line VII—VII in FIG. 2, FIG. 8 is a part-sectional elevation illustrating an alternative tine mounting in accordance with the invention, FIG. 9 is a section, to an enlarged scale, taken on the line IX—IX in FIG. 8, FIG. 10 is a view similar to FIG. 8 but shows a further alternative tine mounting in accordance with the invention, FIG. 11 is a view similar to FIGS. 8 and 10 but shows a still further alternative tine mounting in accordance with the invention, and FIG. 12 is a plan view of the tine mounting of FIG. 11.

Referring to the drawings, and particularly to FIG. 1 thereof, the invention is illustrated in its application to a rotary harrow which could also be considered as being a soil cultivating implement or cultivator. The rotary harrow has a hollow box-shaped frame portion 1 (FIGS. 1 and 2) that extends substantially horizontally transverse, and normally substantially horizontally perpendicular, to the intended direction of operative travel of the harrow which is indicated in FIG. 1 by an arrow A. A plurality (in this case, 12 of vertical or substantially vertical shafts 2 are rotatably mounted in upper and lower bearings of the frame portion 1 and lie in a single row in regularly spaced apart relationship. The distance between the longitudinal axes of two immediately neighboring shafts 2 should not be greater than 30 centimeters and is preferably, but not essentially, substantially 25 centimeters. The lowermost end of each shaft 2 that projects beneath the bottom of the hollow frame portion 1 carries a corresponding tined soil working member that is generally indicated by the reference 3. Each shaft 2 is provided, inside the hollow frame portion 1, with a corresponding straight- or spur-toothed pinion 4, the twelve pinions 4 being of such a size, and being arranged in such a way, that the teeth of each pinion 4 are in mesh with those of the immediately neighboring pinions 4, in the single row thereof. One of the shafts 2 that corresponds to the central pair of soil working members 3 in the row thereof has an upward extension into a gear box 5 and bevel pinions and shafts within the gear box 5 place said shaft extension in driven connection with a rotary input shaft of the gear box 5 through the intermediary of a change-speed gear 6 mounted at the back of the gear box. The change-speed gear comprises a plurality of interchangeable and/or exchangeable pinions of which a pair can be selected to enable a corresponding transmission ratio between shafts in the gear box 5 to be employed thus enabling the shafts 2 to be rotated at different speeds in response to an unchanged speed of rotation applied to the rotary input shaft of the gear box 5. The rotary input shaft that has just been mentioned has a splined or otherwise keyed end that projects forwardly from said gear box in substantially the direction A and that end is arranged to be placed in driven connection with the power take-off shaft of an operating tractor or other vehicle by way of an intermediate telescopic transmission shaft 7, which is of construction that is known per se, having universal joints as its opposite ends.

Two arms 8 are turnable upwardly and downwardly alongside the opposite lateral sides or ends of the hollow frame portion 1 about substantially horizontally aligned pivots located in an upper and leading, with respect to the direction A, region of the frame portion 1. Means that are not shown in detail in the accompanying drawings are provided to enable the arms 8 to be secured in chosen angular settings about the aligned axes of the pivots which have just been mentioned and rearmost end regions of the arms 8 that are inclined downwardly towards the ground behind the frame portion 1 carry the opposite ends of a rotatable supporting member in the form of a ground roller 9. The ground roller 9 extends throughout substantially the whole of the working width of the harrow and is of an open, rather than closed, substantially right circular cylindrical formation. The angular settings of the arms 8 about their pivotal connections to the hollow frame portion 1 that are chosen determine the level of the axis of rotation of the ground roller 9 relative to the remainder of the harrow and this, it will be realised, is a principal factor in determining the working level of the harrow and thus the depths by which the tines of its soil working members 3 can penetrate into the ground.

Arms 10 are turnable about substantially horizontally aligned pivots mounted on top of the frame portion 1 so as to define axes that are substantially parallel to the direction A. The arms 10 extend from their pivot mountings over the opposite lateral sides or ends of the frame portion 1 and there carry upright shield plates 11 whose lowermost edges bear against the ground surface during the operation of the harrow and can slide over that surface in the direction A. The shield plates 11 extend substantially parallel to the direction A and can turn upwardly and downwardly about the pivotal mountings of the arms 10 to match undulations in the surface of the ground that may be met with during passage over the soil. The shield plates 11 co-operate with the soil working members 3 at the opposite ends of the row of those members and minimize ridging of the soil at the opposite edges of the strip of ground that is worked by the members 3 during the operation of the harrow. The shield plates 11 also prevent stones and other potentially dangerous objects from being flung sideways from the harrow by the rapidly moving tines of its soil working members 3 and thus greatly reduce the likelihood of injury to persons in the vicinity and the likelihood of damage to property. The front of the frame portion 1 with respect to the direction A is provided with a coupling member or trestle 12 of generally triangular configuration which coupling member or trestle can be employed in the manner that can be seen in outline in FIG. 1 of the drawings in connecting the harrow to the threepoint lifting device or hitch at the rear of an agricultural tractor or other operating vehicle.

Each soil working member 3 comprises a substantially horizontal tine support 13 that is disposed substantially perpendicular to the longitudinal axis of the corresponding shaft 2 at the lowermost end of which it is disposed. The connection of each shaft 2 to the corresponding tine support 13 is located midway along the length of the latter and it will be seen from FIG. 2, in particular, of the drawings that the opposite ends of each tine support 13 define two tine holders 14 in which fastening portions 15 of rigid soil working tines 16 are firmly, but releasably, secured. The mountings of each of the twelve pairs of tines 16 are all indentical and, accordingly, it is only necessary to describe the mountings of the two tines 16 that correspond to a single soil working member 3 in detail. The tine support 13 and its two tine holders 14 are forged from a single piece of metallic material and the longitudinal axes of the two holders 14 are disposed substantially parallel to the axis of the corresponding shaft 2 and are thus normally vertical or substantially vertical during the use of the harrow. Each holder 14 is of substantially right circular cylindrical external configuration although, as will be evident from FIG. 2, in particular, of the drawings, the material of the wall of each holder 14 is somewhat thicker at the side of the holder which is furthest from the corresponding shaft 2 in a region midway between the top and bottom of the holder than it is at and near the top and bottom. The internal bore of each holder 14 that receives the corresponding tine fastening portion 15 is of upwardly tapering frusto conical configuration (see FIGS. 2 and 4 of the drawings).

The front of each holder 14 with respect to the intended direction of rotation of the corresponding soil working member 3 (see the arrow at the top of FIG. 3 of the drawings) is provided with an integral screen 15A, said screen joining both the holder 14 itself and the neighbouring portion of the tine support 13 that is integral with the holder 14. The integrally forged screen 15A is steeply inclined upwards, and forwardly with respect to the direction of rotation which has just been mentioned, from its junction with the holder 14 and support 13 in the manner which can be seen best in FIG. 4 of the drawings. The provision of the screens 15A also means that there is more of the material from which the support 13, holders 14 and screens 15A are integrally made at the front of each support 13 and holder 14 with respect to the intended direction of rotation of the corresponding soil working member 3 than there is at the rear thereof with respect to the same direction. This arrangement increases the rigidity of the whole integral assembly which is, of course, desirable to avoid or reduce damage when stones or other hard objects in the soil are met with during the operation. A central region of the tine support 13 is formed as a boss 16A having an internally splined bore. The splines 17 in said bore co-operate with external splines at the lowermost end of the corresponding shaft 2 and ensure that the soil working member 3 will be rigid in rotation with its shaft 2 at all times. A short screwthreaded portion is provided beneath the splined portion of each shaft 2 and a nut 18 and washer co-operate with each such screwthreaded portion to maintain the corresponding boss 16A axially in position on the shaft 2. A split pin or the like is used to prevent the loosening of each nut 18.

The top and bottom of the boss 16A are both flat and both project slightly beyond the corresponding surface of the tine support 13. The flat top and bottom are both substantially perpendicular to the longitudinal axis of the shaft 2, the bottom constituting a stop for co-operation with the corresponding nut 18 preferably, although not essentially, through the intermediary of a washer as mentioned above. The top of the boss 16A is of greater diameter than the bottom thereof and affords a screen for the lower bearing of the corresponding shaft 2 when the boss 16A is in its intended operative position.

In addition to the fastening portion 15 of each tine 16 that is arranged in a corresponding one of the holders 14 when the tine is in use, each tine 16 also comprises a lower active or soil working portion 20 that is integrally connected to the fastening portion 15 by way of a short downwardly tapering portion 19. As can be seen in FIG. 4 of the drawings, the longitudinal axis of the tine fastening portion 15 is inclined to the longitudinal axis of the straight active or soil working portion 20 by an angle $\alpha$ which conveniently has a magnitude of substantially 8° and which should preferably not be less than that magnitude. The fastening portion 15 is of upwardly tapering configuration, to match the upward taper of the bore of holder 14 with which it co-operates, but it is formed substantially midway along its upright length with a shallow circumscribing groove 21. Close to its uppermost end, the fastening portion 15 is formed with a recess 22 that is of U-shaped configuration when viewed lengthwise of the longitudinal axis of the portion 15 (see FIG. 5). The top and bottom walls of the recess 22 are stops and both substantially perpendicular to the longitudinal axis of the fastening portion 15. A separate retaining element 23 is arranged to be entered in the recess 22 and is shaped to fit that recess. In particular, the retaining element 23 is shaped to fit around a part 24 of the fastening portion 15 that comprises the material of said portion 15 that is not omitted by the formation of the recess 22 itself. The external curved surface of the retaining element 23 is formed with a screwthread which surrounds the longitudinal axis of the fastening portion 15 to a large extent, although not completely. The outer surface of the retaining element 23 upon which the screwthread is formed is of right circular cylindrical configuration and projects slightly beyond the frusto conical surface of the fastening portion 15 including the part 24 thereof that has just been mentioned. A nut 25 co-operates with the screwthreaded surface of the retaining element 23 and, when tightened, bears against the top of the corresponding holder 14 to draw the tine fastening portion 15 upwardly into tight engagement with the internal bore of that holder. Tightening of the nut 25 moves the retaining element 23 upwardly into contact with the upper surface of the recess 22 and thus, when the condition that is best illustrated in FIG. 4 of the drawings is reached, the fastening portion 15 is firmly located in its holder 14 in a condition of tension.

When in its appointed position in one of the holders 14, each tine fastening portion 15 bears against the wall of that holder 14 by two spaced regions, that is to say, the region above the groove 21 and the region below the groove 21. Diametrically opposed notches are formed internally of each holder 14 at the lower end thereof and, when the corresponding tine 16 is in its operative position, diametrically opposed lugs 26 at the bottom of the fastening portion 15 thereof are entered in said notches thus preventing the tine 16 from turning about the longitudinal axis of its fastening portion 15 in the co-operating holder 14. It will be noted that, under the assembled conditions which have just been described, most of the recess 22 in the fastening portion 15 is located above the level of the top of the corresponding holder 14. The straight active or soil working portion 20 of each tine 16 tapers towards the free end or tip thereof and has an oval cross-section (see FIG. 6) throughout not less than substantially the upper half of its length measured downwardly from the tapering portion 19.

At a level that is located a little more than half way below the midpoint of the length of the active or soil working portion 20 between the tapering portion 19 and the lowermost free end or tip, the oval cross-section that can be seen best in FIG. 6 of the drawings merges progressively into a basically polygonal cross-section that is shown in FIG. 7. FIGS. 5 and 6 of the drawings illustrate perpendicular diagonals $a$ and $b$ of the cross-section of the tine 16 at different levels, the diagonal $a$ being the shorter, and the diagonal $b$ being longer, at the level of the cross-section of FIG. 6. FIG. 7 is similarly orientated to FIG. 6 and it will be seen from a comparison between those Figures that, at the level of FIG. 7 which is close to the lowermost free end or tip of the tine 16, the longer diagonal $b$ has only marginally decreased in length whereas the shorter diagonal $a$ has significantly decreased in length as compared with FIG. 6. At the level of FIG. 7 of the drawings, the length ratio $b : a$ is substantially 2 : 1. Referring again to FIG. 7 of the drawings, it will be noticed that the two opposed corners of the cross-section that are closest to each other are both of convex rounded configuration whereas the two opposed corners that are furthest from each other are both flattened to produce two substantially parallel rib-like surfaces. As seen in FIG. 7 of the drawings, a line interconnecting the midpoints of the two parallel surfaces that have just been mentioned extends substantially tangentially with respect to a circle centered upon the longitudinal axis of the shaft 2 carrying the soil working member 3 of which the tine 16 under consideration forms a part. That part of the active or soil working portion 20 that is of basically polygonal cross-section is formed throughout all or most of its length with hollow grooves 27 in what would otherwise be four substantially flat sides. The upper ends of the grooves 27 decrease in depth and come to points and thus do not appear at levels at which the portion 20 is of oval cross-section.

FIGS. 8 and 9 of the drawings illustrate an alternative form of tine mounting in which a number of parts are similar or identical to parts that have already been described. Accordingly, such parts are designated in FIGS. 8 and 9 of the drawings by the same reference numerals as are employed for the corresponding parts in FIGS. 1 to 7 of the drawings and do not require a repeated description. The same remark applies to the embodiments of FIGS. 10 to 12 of the drawings. In this embodiment, the tine support 13 has a central boss 28 which is of smaller diameter than the boss 16A and the periphery of its upper surface is formed with a shoulder into which is welded the inner edge of a screening ring 29. The screening ring 29 protects the lower bearing of the corresponding shaft 2 when the internally splined boss 28 is disposed in its appointed position on the external splines 17 of that shaft 2. Each holder 14 has a central bore 30 which is of upwardly tapering frusto conical configuration although the taper is much less pronounced than in the embodiment of FIGS. 1 to 7 of the drawings. The upper end of the bore 30 opens onto the top of the holder 14 by way of a circular hole 31 of considerably smaller diameter than the diameter of the upper end of the bore 30 with which it is in communication. A co-operating soil working tine 33 has a fastening portion 32 in which is formed a recess 34 having upper and lower walls that are both substantially perpendicular to the longitudinal axis of the fastening portion 32. The recess 34 is of basically U-shaped configuration but is formed with internal flats (see FIG. 9) that are arranged to co-operate with the flats on the head of a fastening bolt 36. The upper wall of the recess 34 is formed with a slot 35 which extends inwardly from the circumference of the fastening portion 32 to a location beyond the longitudinal axis of that portion, said slot 35 being arranged to receive the shank of the fastening bolt 36. The tine 33 is releasably secured in its operative position by entering the head of the fastening bolt 36 in the recess 34 and the shank of that bolt in the slot 35 and then passing the fastening portion 32 of the tine upwardly through the central bore 30 of the holder 14 from the lowermost end of that bore. The screwthreaded shank of the bolt 36 will protrude upwardly through the hole 31 when the tine fastening portion 32 comes into initial retaining engagement with the internal surface of the bore 30 and a washer 37 and a nut 38 are then applied to the upwardly projecting screwthreaded shank of the bolt 36. The head of the bolt 36 cannot turn in the recess 34 because of the flats that are formed internally of that recess (see FIG. 9) so that, upon tightening the nut 38, the hole 31 is sealed by the washer 37 and the head of the bolt 36 draws the conically tapered surface of the tine fastening portion 32 and the central bore 30 of the holder 14 into firm engagement with one another, the upper wall of the recess 34 serving as a stop for the head of the bolt 36. The tine 33 has an active or soil working portion 39 that may be substantially identical to the active or soil working portion 20 of the previously described tine 16, said tine also being provided with two diametrically opposed lugs 40 that co-operate with diametrically opposed notched located internally of the lower end of the tine holder 14 to prevent the installation tine from turning about the longitudinal axis of its fastening portion 32 in the same manner as has already been described in respect of the lugs 26. As in the preceding embodiment, the longitudinal axes of the fastening portion 32 and active or soil working portion 39 of the tine 33 are inclined to one another by an angle which is conveniently substantially 8° and which it is preferred should not be less than substantially 8°.

FIG. 10 of the drawings illustrates a tine mounting in which the tine holder 14 has an upwardly tapering central bore 41 that is open to its full diameter at the top of the holder 14. This allows a nut 42 to be lodged in the recess 34 of the fastening portion 32 of the previously described tine 33 so that the fastening bolt 36 can be employed in an inverted condition as compared with the arrangement of FIGS. 8 and 9 of the drawings. A rigid cover plate 43 closes the open top of the central bore 41 and is formed with a central hole through which is passed downwardly the shank of the bolt 36, the head of that bolt co-operating with the top of the cover 43. The bolt 36 can thus be tightened by a tool that co-operates with its head, rather than with the nut 42, that nut bearing against the upper wall of the recess 34 when the bolt 36 is tightened so that said upper wall again serves as a stop. The nut 42 will not turn in the recess 34 because of the internal flats that are formed in that recess as illustrated in FIG. 9.

FIGS. 11 and 12 of the drawings illustrate a further alternative tine mounting in which each holder 14 has a central bore 44 that is of upwardly tapering frusto conical configuration. The central bore 44 is arranged to receive a matchingly tapered fastening portion 45 of a rigid soil working tine 46. As in the case of the tine 16 that has been described with reference to FIGS. 1 to 7 of the drawings, the fastening portion 45 of the tine 46 merges into an active or soil working portion 48 thereof by way of a short downwardly tapering portion or neck 47. The portion or neck 47 carries two diametrically opposed lugs 49 that are arranged to enter matching diametrically opposed notches formed in the wall of the central bore 44 at the bottom of the holder 14. As in the preceding embodiments, the lugs 49 and co-operating notches prevent the tine 46 from turning about the longitudinal axis of its fastening portion 45 in the holder 14 when the tine is fixed in its appointed operative position. Once again, the fastening portion 45 and active or soil working portion 48 are both straight, their longitudinal axes being inclined to one another by an angle which is conveniently substantially 8° which it is preferred should not be less than substantially 8°. The active or soil working portion 48 is substantially identical in construction to the active or soil working portion 20 of the previously described tine 16. In the embodiment of FIGS. 11 and 12 of the drawings, the fastening portion 45 of the tine 46 is formed adjacent its uppermost free end with two diametrically opposed recesses 50 each of which recesses has both upper and lower walls or surfaces that are both substantially perpendicular to the longitudinal axis of the fastening portion 45. The fastening portion of the tine 45 can be drawn upwardly into tight engagement with the central bore 44 of the holder 14 with the aid of a displaceable element 51, said element 51 being arranged so that it can be entered in either one of the opposed recesses 50, the mode of entry which is employed being such as to effect firm engagement of the fastening portion 45 in the central bore 44 of the holder 14.

The displaceable element 51 is principally of circular disc shape and has a central hole through which the shank of a bolt 52 can be screwed into a matchingly threaded blind bore 53 opening onto the top of the tine support 13. It will be seen from FIG. 11 of the drawings that an upper end region of the shank of the bolt 52, just beneath the head of the bolt, has no screwthread so that the element 51 can turn about the axis of the bolt 52. The edge of the element 51 that is entered in the chosen recess 50 has an upwardly directed cam rim 54 whose height progressively increased from one end thereof to the midpoint of the curved length of the rim and then progressively decreases to the opposite end of that rim. The cam rim 54 subtends an angle of substantially 120° at the longitudinal axis of the pivot bolt 52. The demensions of the cam rim 54 are such that, when it is located with substantially its center in the chosen recess 50, the fastening portion 45 is drawn as far upwardly as is possible into the central bore 44 of the holder 14, the lugs 49 being entered substantially fully in the matching grooves at the lowermost end of the holder 14. Once this position has been reached by turning the element 51 about the longitudinal axis of the bolt 52 in the manner which will be described below, the bolt 52 can be fully tightened so as to prevent the element 51 from turning thereabout which would allow the tine 46 to become loose. The element 51 is brought to the position in which the central portion of its cam rim 54 is in the chosen recess 50 with the aid of a tool in the form of a key 55. The key 55 is also employed to turn the element 51 out of the tine-fastening position which has just been mentioned. The key 55 has a substantially concave recess 56 at one end, said recess 56 fitting around the head of the bolt 52 and two dowels 57 that project downwardly from the lower surface of the key 55 to enter holes formed in the element 51 at diametrically opposite sides of the bolt 52. When the dowels 57 are entered in the co-operating holes in the element 51, the key 55 can be employed in the manner of a lever to turn the element 51 forcibly about the axis of the bolt 52. A concave recess 58 is formed in the edge of the element 51 at a location diametrically opposite to the midpoint of the cam rim 54 and, when said element 51 has been turned through 180° about the axis of the bolt 52 as compared with the position thereof that is shown in FIGS. 11 and 12 of the drawings, the recess 58 will be opposite to the chosen recess 50 so that the tine fastening portion 45 can be inserted, or withdrawn, without being blocked by the element 51.

The tine mountings that have been described above comprise means that are capable of directly engaging stops formed on tine fastening portions to retain those fastening portions in co-operating tine holders under tension or compression. Said means comprises the screwthreaded retaining element 23 in the embodiment of FIGS. 1 to 7 of the drawings, the head of the bolt 36 in the embodiment of FIGS. 8 and 9, the nut 42 in the embodiment of FIG. 10 and the displaceable element 51 in the embodiment of FIGS. 11 and 12. In each case, the stop is afforded by a wall or surface of a recess formed in a upper part of the tine fastening portion. The circumscribing groove 21 that is formed in the fastening portion 15 of the tine 16 of FIGS. 1 to 7 of the drawings enables tine material to be used more economically without detracting from the effective fixing of the fastening portion 15 in its holder 14. The shape of the active or soil working tine portion 20 that has been described with particular reference to FIGS. 2, 4, 6 and 7 of the drawings gives that portion great rigidity without using unnecessary tine material and ensures that the resistance to passage thereof through the soil during operation is not sufficiently great to cause rapid wear or any great tendency to bending or breaking under all likely operating conditions.

Although various features of the tine mountings that have been described and/or that are illustrated in the accompanying drawings will be set forth in the following claims as inventive features, it is emphasised that the invention is not necessarily limited to those features and that it includes within its scope each of the parts of each tine mounting that has been described and/or that is illustrated in the accompanying drawings both individually and in various combinations.

What we claim is:

1. A tine mounting for a rotary harrow including a generally horizontal support with at least one tine holder on said support, a tine having a fastening portion and said portion being fitted in an internal bore of said holder, said fastening portion having at least one recess, said recess, viewed lengthwise of the longitudinal axis of said fastening portion, being substantially U-shaped, tightening means on said mounting and said tightening means engaging a flat wall of said U-shaped recess and urging the said fastening portion into tight engagement with said bore.

2. A tine mounting as claimed in claim 1, wherein said tightening means comprises a separate element that engages said wall, said separate element having an external screw-threaded surface that receives a fastening nut.

3. A tine mounting as claimed in claim 2, wherein, said external screw-threaded surface projects laterally from said recess and beyond said fastening portion.

4. A tine mounting as claimed in claim 1, wherein said tightening means comprises a bolt having a head and said head is received in said U-shaped recess, a screw-threaded shank of said bolt projecting from said fastening portion and a tightening nut engaging said shank.

5. A tine mounting as claimed in claim 1, wherein, said U-shaped recess is located substantially outside and above said holder.

6. A tine mounting as claimed in claim 1, wherein said fastening portion comprises two spaced apart regions and a further region of reduced diameter between the two regions, said two regions separately engaging two internal regions of said bore.

7. A tine mounting as claimed in claim 1, wherein said fastening portion has lugs that cooperate with notches in said holder and prevents said tine from turning about the longitudinal axis of its fastening portion, said lugs being located diametrically opposite one another with respect to the longitudinal axis of said fastening portion and said notches being located at the lower side of said holder.

* * * * *